Aug. 3, 1954

E. E. YEO ET AL 2,685,268

SOLDER DISPENSING APPARATUS

Filed May 31, 1950

INVENTORS
ERNEST E. YEO
ARTHUR S. JOHNSON
BY Joseph C Ryan
ATTORNEY

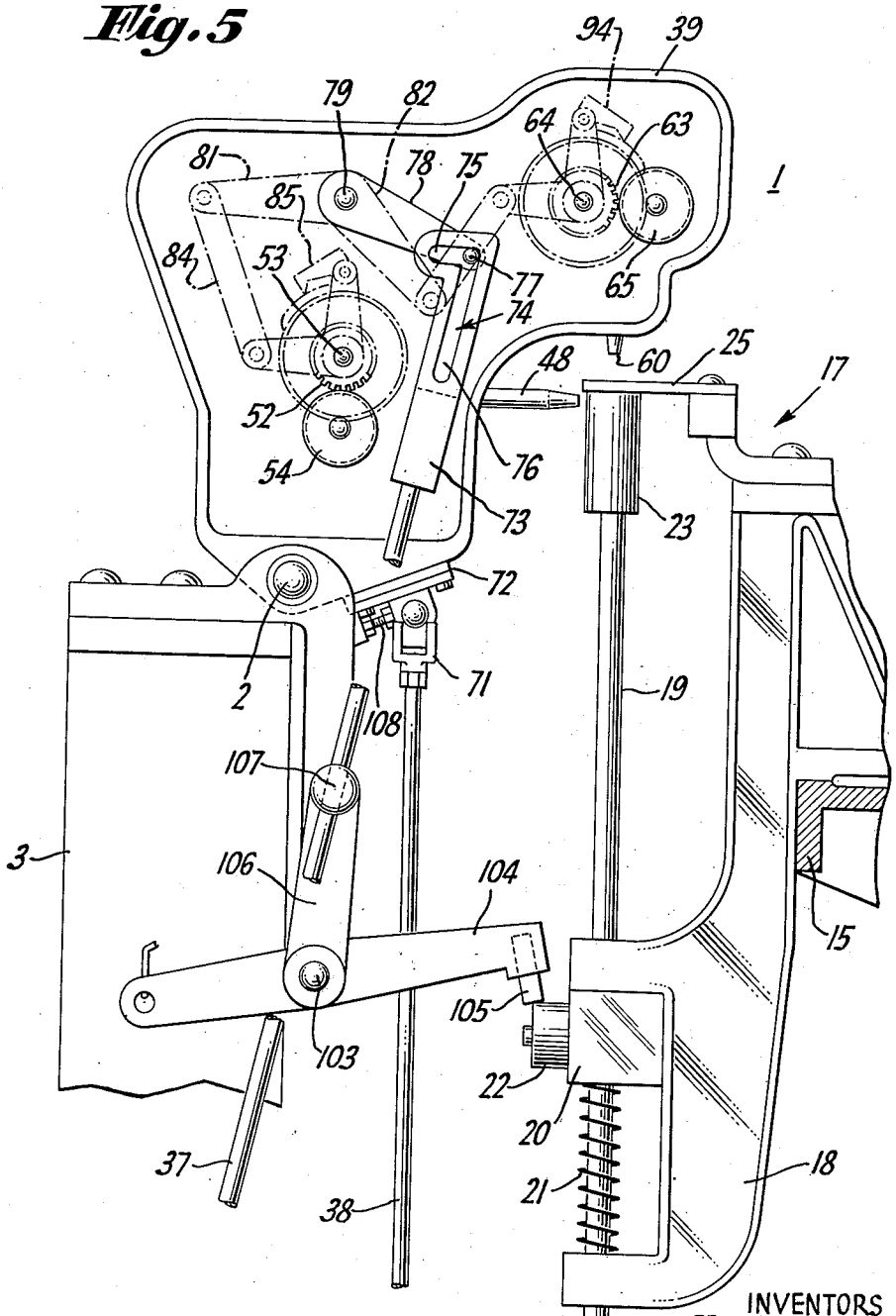

Patented Aug. 3, 1954

2,685,268

UNITED STATES PATENT OFFICE 2,685,268

SOLDER DISPENSING APPARATUS

Ernest E. Yeo, Wenham, and Arthur S. Johnson, Danvers, Mass., assignors to Sylvania Electric Products Inc., Salem, Mass., a corporation of Massachusetts Application May 31, 1950, Serial No. 165,228

1 Claim. (Cl. 113—59)

This invention relates to electric lamp manufacturing equipment and more particularly to a solder dispensing apparatus.

In the art of electric lamp manufacturing, and more particularly in the incandescent lamp manufacturing art, one of the operations performed is soldering of the lamp lead wires to the side and the top of the lamp base. Heretofore the side soldering and the top soldering have been effected independently at different stations on a lamp basing machine and the pilots through which the solder is fed have been reciprocated into and out of their feeding positions.

An object of this invention is to provide a solder dispensing apparatus in which the side soldering operation and the top soldering operation are performed simultaneously at the same station on a lamp basing machine.

Another object is to provide a common mechanism for actuating both the top and the side soldering units.

A further object is to provide a solder dispensing apparatus in which the pilots through which the solder is fed are fixedly mounted.

Another object is to provide a solder dispensing apparatus in which the pilots are adjustably mounted thereon to permit use of the apparatus with different sizes of lamps.

A further object is to provide means for varying the quantity of solder fed during each soldering cycle.

Another object is to provide means for automatically rendering the solder feeding apparatus inoperative when a lamp is not present in the basing machine head to which solder would normally be fed.

Further objects, advantages and features will be apparent from the following description thereof when read in conjunction with the accompanying drawings in which:

Figure 5 is an elevational view of the solder dispensing apparatus showing the means for rendering the dispensing mechanism inoperative when a lamp is not present in a lamp basing machine head. The mechanism on the side opposite that illustrated is shown in phantom and parts of the solder feeding mechanism normally visible have been omitted for clarity of illustration.

Figure 1:
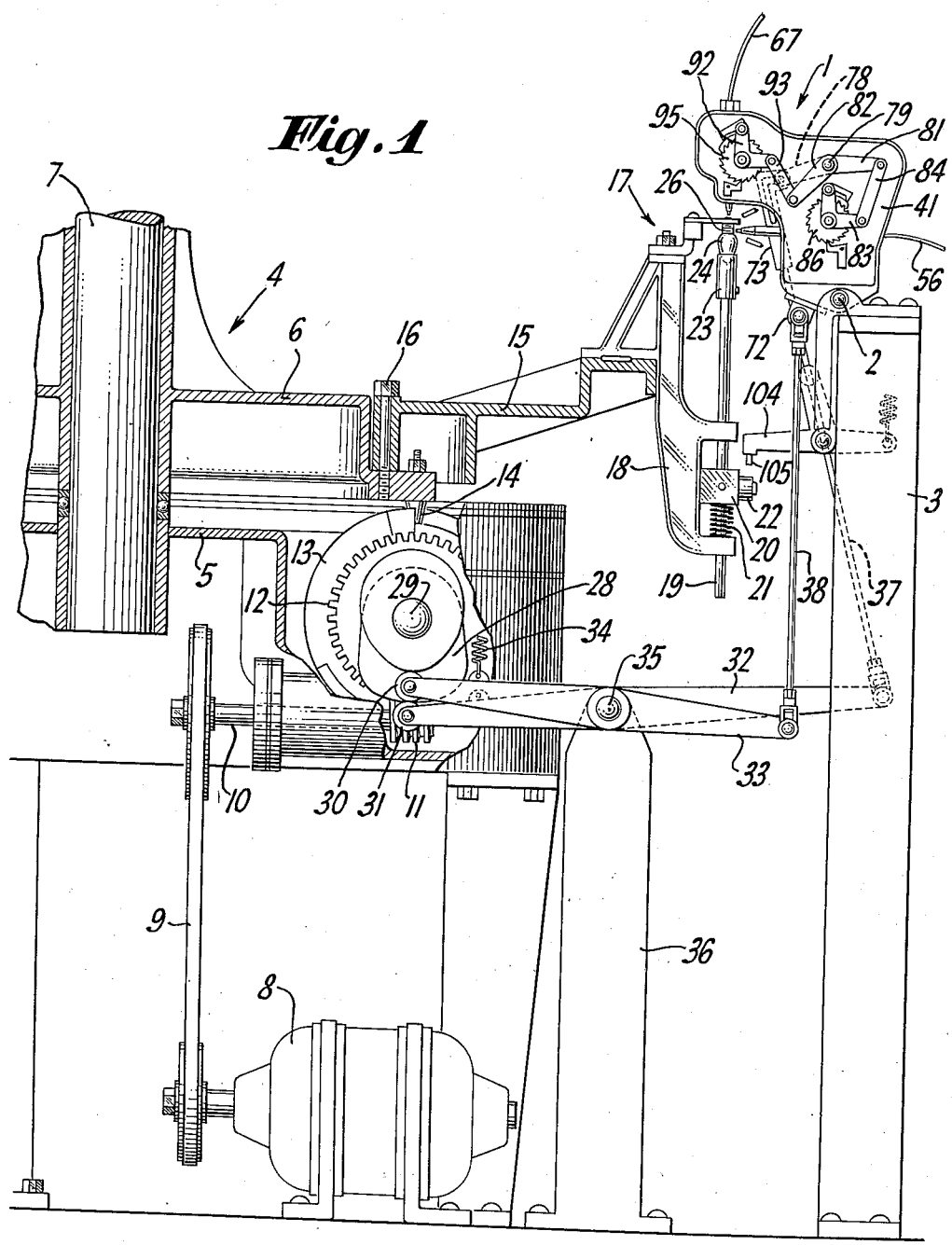
Figure 1 is an elevational view partly in section of a portion of an incandescent lamp basing machine showing the solder dispensing apparatus in the feeding position and a portion of the mechanism which actuates this apparatus.

Referring first to Figure 1, the solder dispensing apparatus comprises a solder dispensing head 1 pivotally mounted on a shaft 2 in a standard 3 adjacent the periphery of a lamp basing machine 4. Since this invention is not concerned with a particular lamp basing machine per se, only those parts of a suitable machine of this type are shown in the drawings and described below as may be necessary for an adequate understanding of the solder dispensing apparatus.

The lamp basing machine 4 comprises a fixed table 5 and a rotatable table 6 mounted on a rotatable shaft 7. Rotation of the table 6 and the shaft 7 is effected by means of a motor 8 connected thereto through belt 9, shaft 10, worm 11, worm gear 12, cam 13 and index roller 14 mounted on the table 6. A head-carrying table 15 is attached to rotatable table 6 by means of a bolt 16. The table 15 has a plurality of heads 17 mounted on the periphery thereof. Indexing rotational movement of the table 15 carries the heads 17 through a plurality of stations at which the various conventional operations normally effected on a lamp basing machine are accomplished.

Each head 17 comprises a bracket 18 with a spindle 19 supported therein. The spindle 19 has a block 20 mounted thereon and a spring 21 disposed thereabout between the block 20 and the lowermost portion of the bracket 18. The block 20 has a roller 22 mounted thereon, the purpose of which will be described below. A holder 23, in which a lamp 24 is seated, is mounted on the top of the spindle 19. The lamp 24 is securely retained in its seat in the holder 23 by a plate 25 mounted on the top of the bracket 18. This plate 25 is cut away at its forward edge to permit the top of the base 26 of the lamp 24 to extend slightly thereabove. Seating of a lamp 24 in a holder 23 is accomplished by positioning the lamp therein, pushing the spindle downwardly until the base 26 of the lamp is below the plate 25 and then permitting the spindle to ride upwardly until the base 26 engages the plate 25. The spring 20 on the spindle 19 insures a firm positive seating of the lamp 24 in its holder 23.

The mechanism for actuating the solder dispensing head 1 is shown in Figure 1. This mechanism comprises a pair of cams 27 and 28 on driven shaft 29, on which gear 12 and cam 13, which drive tables 6 and 15 of the lamp basing machine 4, are mounted. Rotational movement of the cams 27 and 28 is transmitted through rollers 30 and 31 respectively to rocker arms 32 and 33 respectively. Rocker arms 32 and 33, both of which are spring loaded (one of the springs 34 being shown), are mounted on a shaft 35 supported on a standard 36. Movement of the rocker arms 32 and 33 is transmitted to the solder dispensing head 1 through rods 37 and 38 respectively. Rod 38 has a yoke 71 mounted on the upper end thereof, through which it is fixedly connected to a bracket 72 on the base of a casing 39. Since the head 1 is pivotally mounted on shaft 2, actuation of the rod 38 effects movement of the head 1 into and out of its operation position. Rod 37 has a latch 73 mounted on the upper end thereof. Motion of the rod 37 is transmitted through latch 73 to certain mechanisms described below which actuate the solder feed.

Figure 3:
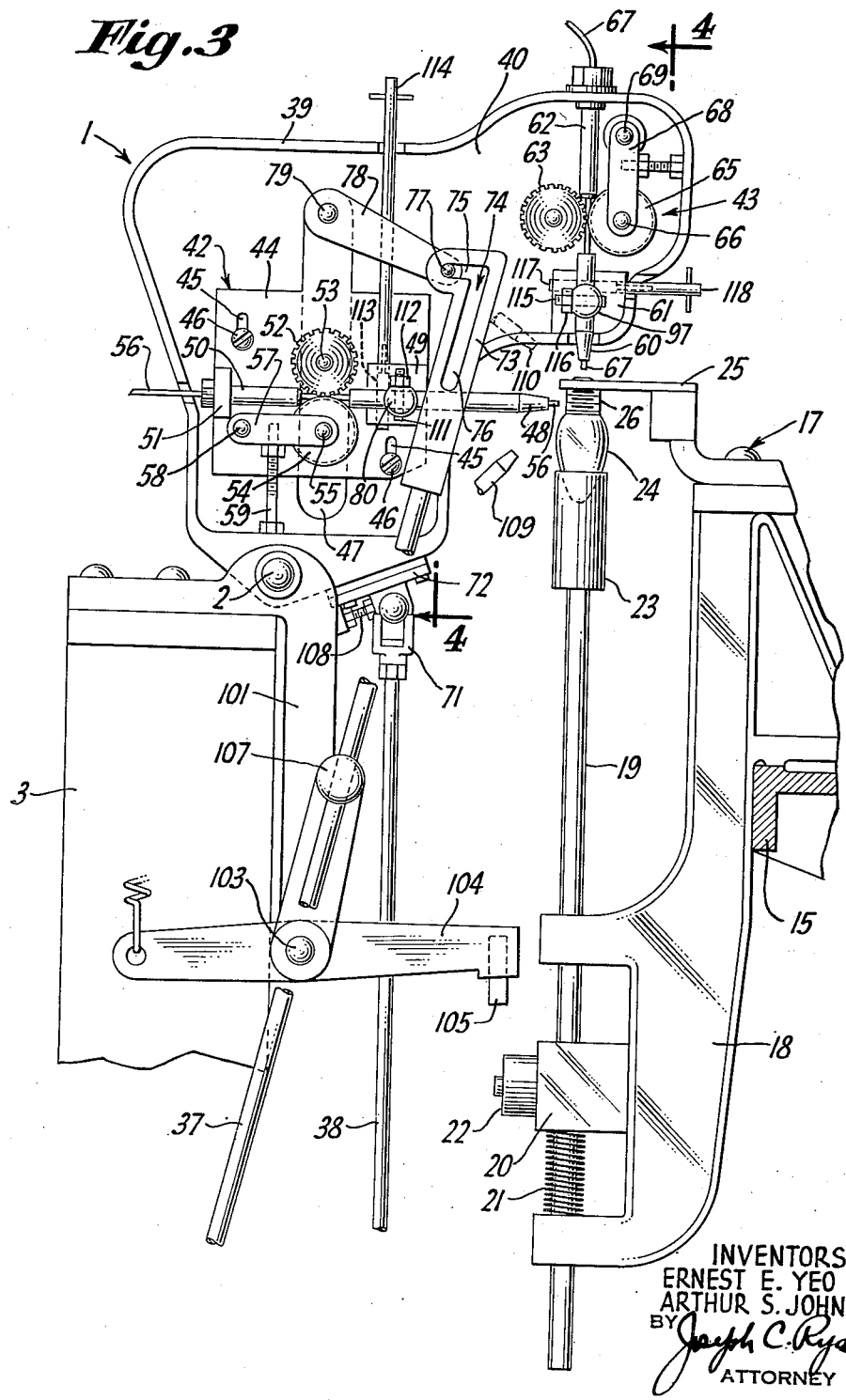
Figure 3 is an enlarged elevational view of the solder dispensing apparatus showing the side thereof opposite to that shown in Figure 2. In this figure the apparatus is shown in the feeding position.
Figure 4:
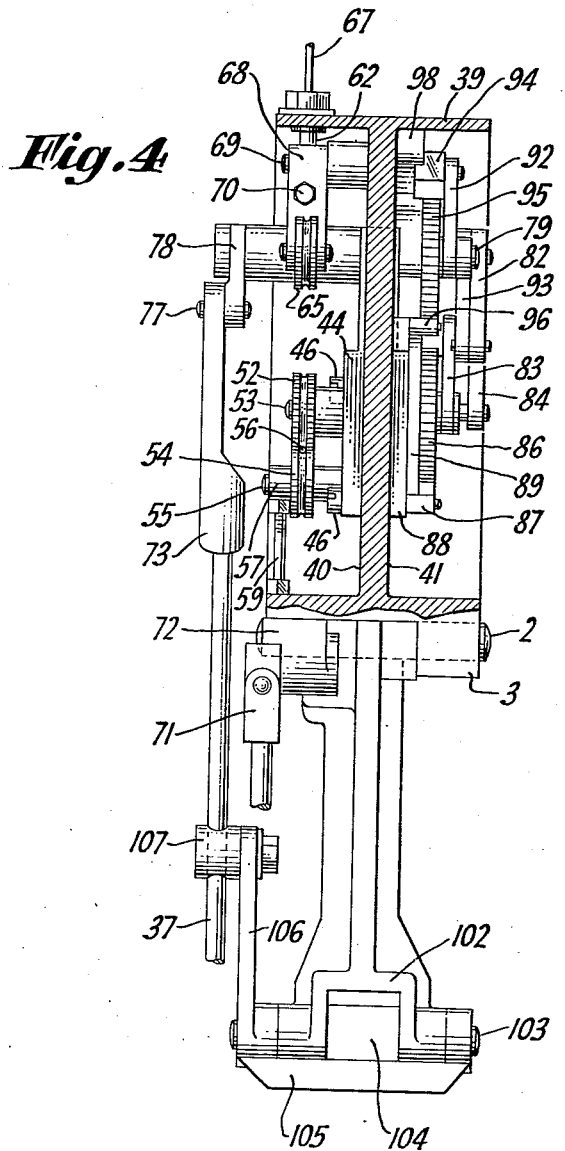
Figure 4 is a sectional view of the solder dispensing apparatus taken along the line 4—4 of Figure 3 with a portion of the front casing removed for clarity in illustration.

As may be seen in Figure 4, the solder dispensing head 1 comprises an I-shaped casing 39 with certain mechanisms disposed on faces 40 and 41 thereof. The solder feeding mechanism is disposed on face 40 and the mechanism for actuating the solder feeding mechanism is disposed on face 41. Figure 3 is an elevational view of face 40 showing the solder feeding mechanism thereon. The mechanism for actuating the solder feeding mechanism, which is disposed on face 41, is shown in elevation in Figures 1 and 2.

As was stated above in the objects of the invention, one of the features of this apparatus is that it effects both the top and the side soldering operations simultaneously at the same station on the lamp basing machine. In Figure 3, the solder feeding mechanism for effecting the side soldering is indicated generally by the numeral 42 and the solder feeding mechanism for effecting the top soldering is indicated generally by the numeral 43. Another feature of the apparatus of this invention is its adjustability to permit its ready adaptation for effecting the soldering operation on lamps of various sizes. In Figure 3, the adjustment of the side solder feeding mechanism 42 is made possible by mounting it on an adjustable plate 44. The plate 44 has a pair of elongated slots 45 cut therein through which screws 46 extend to attach the plate to the face 40. Since some members of the side solder feeding mechanism 42 extend through the I-shaped casing 39 from face 40 to face 41 where they are connected to their actuating mechanism, the I-shaped casing is provided with an elongated slot 47 to provide an unobstructed path through which these members may move when the plate 44 is raised or lowered.

In Figure 3, the side solder feeding mechanism 42 comprises a pilot 48 supported in a swivel holder 80 which is mounted in block 49 attached to plate 44, a pilot 50 mounted in a block 51 attached to plate 44, a serrated roll 52 mounted on a shaft 53 and a pressure roll 54 mounted on a shaft 55. The solder 56, fed from a source (not shown) is threaded through pilot 50, between rolls 52 and 54 and through pilot 48. Advancement of the solder 56 through pilots 50 and 48 is effected by the action of the rolls 52 and 54 thereon. Shaft 53 is rotated by mechanisms described below, thereby causing rolls 52 and 54 to rotate and effect advancement of the solder 56. The shaft 55, on which the pressure roll 54 is mounted, is supported in one end of a bracket 57 which is pivotally mounted at 58 on plate 44. Adjustment of the pressure roll 54 to insure positive feeding of the solder 56 is accomplished by manipulation of the adjusting screw 59.

In Figure 3, the top solder feeding mechanism 43 comprises a pilot 60 supported in a swivel holder 97 which is mounted in block 61 attached to face 40, a pilot 62 depending from the top of the I-shaped casing 39, a serrated roll 63 mounted on a shaft 64 and a pressure roll 65 mounted on a shaft 66. The solder 67, fed from a source (not shown) is threaded through pilot 62, between rolls 63 and 65 and through pilot 60. Advancement of the solder 67 through pilots 62 and 60 is effected by the action of the rolls 63 and 65 thereon. Shaft 64 is rotated by mechanisms described below, thereby causing rolls 63 and 65 to rotate and effect advancement of the solder 67. The shaft 66, on which pressure roll 65 is mounted, is supported in one end of a bracket 68 which is pivotally mounted at 69 on face 40. Adjustment of the pressure roll 65 to insure positive feeding of the solder 67 is accomplished by manipulation of the adjusting screw 70.

Figure 2:
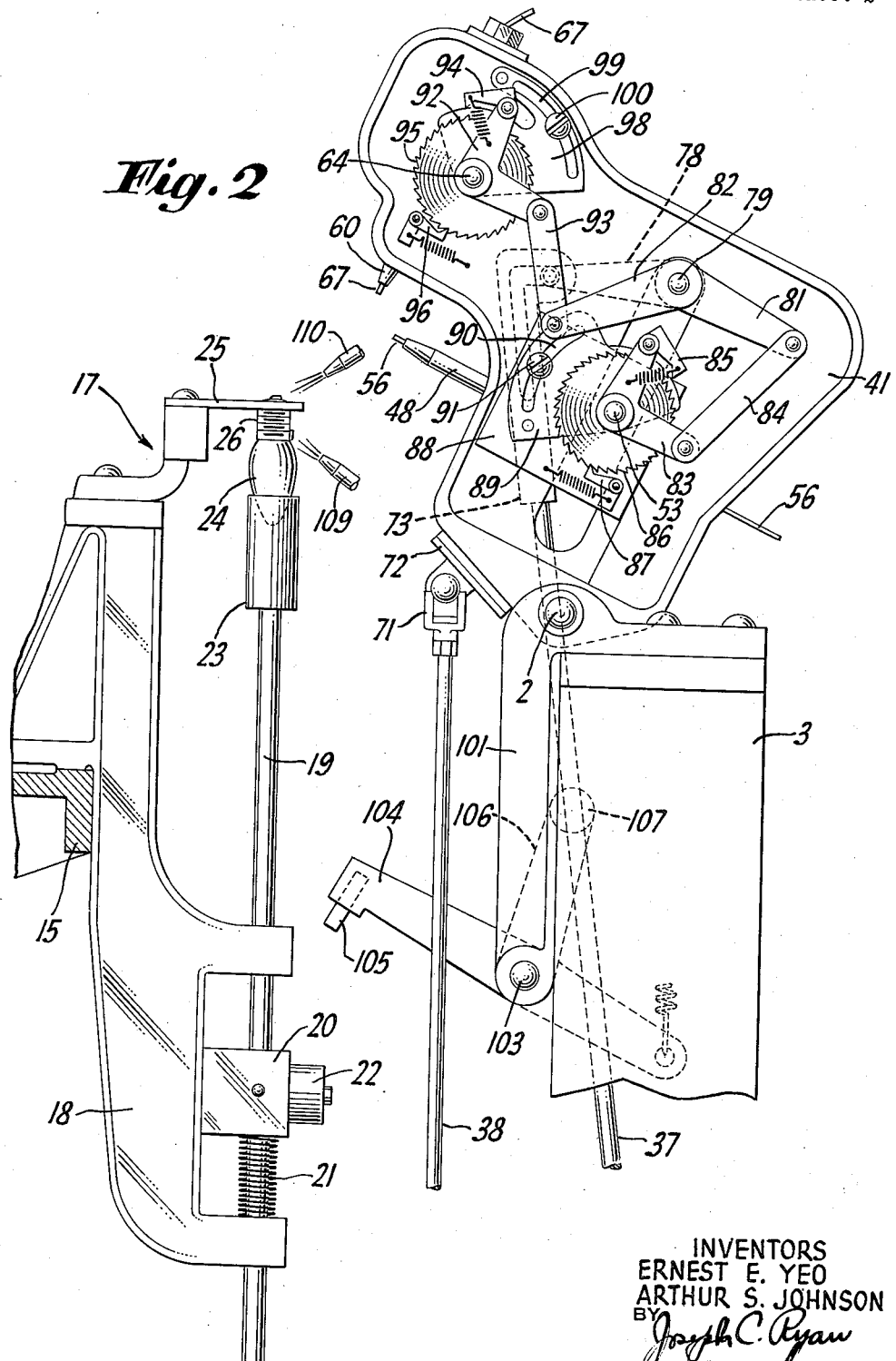
Figure 2 is an enlarged elevational view of the solder dispensing apparatus, the side shown being the same as that illustrated in Figure 1. In this figure the apparatus is shown in its retracted position.

As was mentioned above, the mechanism for actuating the solder feeding mechanism, which is disposed on face 41, is shown in elevation in Figures 1 and 2. Referring first to Figure 3, actuation of the mechanism which actuates the solder feeding mechanism is effected by movement of rod 37 through latch 73 mounted on the top thereof. The latch 73 has an L-shaped slot 74 cut therein, the slot having a toe portion 75 and a shank portion 76. A pin 77, on the free end of a lever 78, rides in slot 74. Movement of rod 37 is transmitted through pin 77 into rotational movement of shaft 79 on which lever 78 is mounted. Shaft 79 which is supported in the top of plate 44, extends therethrough and through the slot 47 to the other side of the head 1 where it is connected to the mechanism for actuating the solder feeding mechanism disposed on face 41.

Referring now to Figures 1, 2 and 4, a pair of levers 81 and 82 are mounted on shaft 79. By mounting both of these levers on the same shaft, a common means for simultaneously actuating both the mechanism for actuating the side solder feed and the mechanism for actuating the top solder feed is provided.

Lever 81 is connected to lever 83 through a link 84. Lever 83 is mounted on shaft 53 but is not fixedly attached thereto. A pawl 85 is mounted on lever 83 and is engageable with the teeth of a ratchet wheel 86 which is fixedly attached to shaft 53. A detent 87 is mounted on a plate 88 on the face 41 of the casing 39. An adjusting plate 89 is mounted on plate 88. The plates 88 and 89 have an aperture therein (not shown) through which shaft 53 extends. The plate 89 has an elongated arcuate slot 90 cut therein. A screw 97 extends through this slot 90 and secures the plate 89 to the plate 88. The contour of plate 89 and its relative location with reference to the pawl 85 is such that the pawl 85 rides on the periphery thereof during a portion of the operating cycle of the mechanism before the pawl 85 finally engages the teeth in the ratchet wheel 86 and effects rotation thereof and rotation of the shaft 53 on which the ratchet wheel 86 is fixedly mounted.

Lever 82 is connected to lever 92 through a link 93. Lever 92 is mounted on shaft 64 but is not fixedly attached thereto. A pawl 94 is mounted on lever 92 and is engageable with the teeth of a ratchet wheel 95 which is fixedly attached to shaft 64. A detent 96 is mounted on the face 41 of the casing 39. An adjusting plate 98 is mounted on face 41. The plate 98 has an aperture therein (not shown) through which shaft 64 extends. The plate 98 has an elongated arcuate slot 99 cut therein. A screw 100 extends through this slot 99 and secures the plate 98 to the face 41 of casing 39. The contour of plate 98 and its relative location with reference to the pawl 94 is such that the pawl 94 rides on the periphery thereof during a portion of the operating cycle of the mechanism before the pawl 94 finally engages the teeth in the ratchet wheel 95 and effects rotation thereof and rotation of the shaft 64 on which the ratchet wheel 95 is fixedly mounted.

As was mentioned above, one of the objects of this invention is the provision of means for automatically rendering the solder feeding apparatus inoperative when a lamp is not present in the basing machine head to which solder would normally be fed. Referring to Figures 3, 4 and 5 of the drawings, a bracket 101, having a yoke portion 102 is fixedly mounted on standard 3 and depends therefrom. A shaft 103 is rotatably mounted in yoke 102. A lever 106, one end of which is attached to an end of shaft 103, has a guide 107 on the other end thereof through which rod 37 extends. A spring-loaded arm 104 is fixedly mounted on the shaft 103 intermediate the ends thereof. The arm 104 has a track 105 on one end thereof and substantially perpendicular thereto which is engageable, under certain conditions described below, by roller 22 of block 20 on spindle 19.

The operating cycle of the solder dispensing apparatus will now be described. When a head 17 carrying a lamp 24 approaches the soldering station, the solder dispensing head 1 is disposed in the retracted position substantially as shown in Figure 2. As the head moves into the soldering station it is drawn downwardly by the rod 38, which is connected thereto through the bracket 72, until the bracket 72 engages the adjusting screw 108 which protrudes from bracket 101. The head 1 is now disposed in its operative position as shown in Figures 1 and 3. After the head 1 has reached its operative position, the rod 37 is moved upwardly by its actuating mechanism to thereby actuate the mechanism which actuates the solder feeding mechanism. In Figure 3, as the rod 37 moves upwardly, its motion is translated into counter-clockwise rotational movement of the shaft 79 through the latch 73 on the end of rod 37 and the lever 78 on the shaft 79, the latch 73 and the lever 78 being connected to one another through the pin 77 on the lever 78.

Referring now to Figures 1 and 2, rotational movement of the shaft 79 causes clock-wise rotational movement of levers 81 and 82 which are fixedly mounted thereon. Clock-wise rotational movement of the lever 81 is transmitted into similar movement of lever 83 through link 84. The pawl 85, mounted on the lever 83, moves therewith in a clock-wise direction, riding along the periphery of the adjusting plate 89 during a portion of its stroke and finally moving off of the plate 89 into engagement with the teeth of the ratchet wheel 86, causing the wheel, and consequently the shaft 53 on which the wheel is fixedly mounted, to rotate. Rotation of the shaft 53 causes rotation of the serrated roll 52 on the other face of the head (Figure 3). Rotation of the serrated roll 52 effects advancement of the solder 56 from pilot 50 into pilot 48 and causes a quantity thereof to project outwardly from pilot 48 a distance sufficient to have it melted onto the side of the base 26 by burner 109, thereby effecting the side soldering operation.

Referring again to Figures 1 and 2, clockwise rotational movement of lever 82 is translated into counter-clockwise rotational movement of lever 92 through link 93. The pawl 94, mounted on the lever 92, moves therewith in a counter-clockwise direction, riding along the periphery of the adjusting plate 98 during a portion of its stroke and finally moving off of the plate 98 into engagement with the teeth of the ratchet wheel 95, causing the wheel, and consequently the shaft 64 on which the wheel is fixedly mounted, to rotate. Rotation of the shaft 64 causes rotation of the serrated roll 63 on the other face of the head (Figure 3). Rotation of the serrated roll 63 effects advancement of the solder 67 from pilot 62 into pilot 60 and causes a quantity thereof to project outwardly from pilot 60 a distance sufficient to have it melted onto the top of the base 26 by burner 110, thereby effecting the top soldering operation.

After the head 1 has completed the solder dispensing operation, the rod 38 moves upwardly and moves the head from its operative position as shown in Figures 1 and 3 into the retracted position as shown in Figure 2. The mechanism which actuates the solder feeding mechanism is also returned to its original position at this time. Downward movement of the rod 37 effects clockwise rotational movement of the shaft 79 through latch 73, pin 77 and lever 78 (Figure 3). This rotational movement of the shaft 79 effects a reversal of the actuation cycle described above of the mechanism for actuating the solder feeding mechanism (Figures 1 and 2). Detents 87 and 96 prevent rotation of ratchet wheels 86 and 95 respectively during the return stroke of this mechanism.

As was mentioned above, one of the objects of this invention is to provide means for automatically rendering the solder feeding apparatus inoperative when a lamp is not present in the basing machine head to which solder would normally be fed. This mechanism and the manner in which it operates is shown in Figure 5. In Figure 5, a head 17 is shown at the station at which the head 1 normally dispenses solder. However, no lamp is present in the holder 23 of the spindle 19. Since the spindle 19 is spring-loaded by the spring 21, the absence of a lamp in the holder 23 results in the block 20 on the spindle 19 assuming the position shown in Figure 5, rather than the position it would assume if a lamp were present, as in Figure 3, for example. This causes the roller 22 which is attached to the block 20, to lie in the same horizontal plane as that of the track 105 on arm 104. Thus when the head 17 in Figure 5 moves into the solder-dispensing station, the roller 22 engages track 105 and causes the arm 104 to rotate counter-clockwise. Counter-clockwise rotation of the arm 104 is transmitted through shaft 103 on which it is mounted into counter-clockwise movement of lever 106. Since the rod 37 extends through guide 107 on lever 106, the rod 37 rotates counter-clockwise. This movement of rod 37 effects a displacement of pin 77, which is normally disposed in the toe 75 of slot 74 in latch 73, until it assumes the position shown in Figure 5, viz., in alignment with the shank 76 of slot 74. Now when the rod 37 moves upwardly for what would normally be the stroke which actuates the mechanism which actuates the solder feeding mechanism, the pin 77 merely rides in the shank 76 of slot 74 instead of transmitting this upward movement through lever 78 to shaft 79.

One of the features of this apparatus is the means through which the quantity of solder fed during each operating stroke of the solder dispensing head may be increased or decreased. In the above description of the operating cycle it was pointed out that pawls 85 and 94 (Figure 2) rode on the periphery of adjusting plates 89 and 98 respectively during a portion of the power stroke before they finally engaged the teeth of ratchet wheels 86 and 95 respectively. The serrated rolls 52 and 63 (Figure 3) are rotated and thus caused to advance solder only during that portion of the power stroke in which the ratchet wheels 86 and 95 are rotated by the pawls 85 and 94 respectively. Thus the quantity of solder advanced in any case is determined by the degree of rotation of ratchet wheels 86 and 95. Since the rotation of these ratchet wheels is effected by the engagement of the pawls 85 and 94 therewith, the quantity of solder advanced by the serrated wheels 52 and 63 may be regulated by adjusting the adjusting plates 89 and 98 to cause the pawls 85 and 94 to engage the ratchet wheels 86 and 95 early or late in the power stroke of the actuating mechanism.

Thus if a relatively large quantity of solder is to be advanced plate 89 (Figure 2) would be rotated counterclockwise and plate 98 clockwise so that pawls 85 and 94 would drop off of the peripheries thereof very early in the power stroke and thus cause a greater degree of rotation of ratchet wheels 86 and 95 and serrated rolls 52 and 63. Conversely, if a smaller quantity of solder is to be advanced, the plates 89 and 98 would be rotated in the reverse direction so that the pawls 85 and 94 would drop off of the peripheries thereof very late in the power stroke and thus cause a lesser degree of rotation of ratchet wheels 86 and 95 and serrated rolls 52 and 63. Rotational adjustment of the plates 89 and 98 is accomplished by loosening the screws 91 and 100 respectively, swinging the plates around to the desired position and then locking them there by tightening the screws.

One of the features of this solder dispensing apparatus described above is the adjustability of the side solder feeding mechanism 42 to permit its ready adaptation for effecting the side soldering operation on lamps of various sizes. This adjustability is made possible by mounting it on the adjustable plate 44. However, further adjustment of the pilot 48 of the side solder feeding mechanism 42 may be made to cause it to be disposed at an angle to the horizontal whenever this is necessary.

As was mentioned above, the pilot 48 (Figure 3) is supported in the swivel holder 80. The pilot 48 is securely retained in the swivel holder 80 by a locking pin 111 disposed in the swivel holder 80. This locking pin 111 has a cut-away portion which partially encircles the pilot 48. Tightening of the nut 112 on the threaded portion of the locking pin 111 effects a locking of the pilot 48 in the swivel holder 80 since tightening of the nut 112 causes the locking pin 111, through its cut-away portion which partially encircles the pilot 48, to push the pilot into a firm positive engagement with the wall of the swivel holder through which it extends and to securely retain it in this position.

As was mentioned above, the swivel holder 80 is mounted in block 49. The swivel holder 80 is securely retained in block 49 by a locking pin 113 disposed in the block 49. This locking pin has a cut-away portion which partially encircles the swivel holder 80. A handle 114 extends through the top of the casing 39 and its lower end rests on top of the block 49. This end of the handle 114 has a threaded aperture therein, into which the threaded portion of locking pin 113 extends. Thus the swivel holder 80 may be securely locked in position by tightening the handle 114 since tightening of the handle 114 causes the locking pin 113 to which it is connected to be drawn upwardly. The upward movement of the locking pin 113 pushes the swivel holder 80, which it partially encircles, into a firm positive engagement with the wall of the block 49 into which it extends and securely retains it in position.

Removal of the pilot 48, and the swivel holder 80 in which it is mounted, from the solder dispensing head 1 may be accomplished by simply loosening the handle 114 until the locking pin 113 frees the swivel holder 80 and then withdrawing it from the block 49. Angular adjustment of the pilot 48 may be effected by loosening the handle 114 until the locking pin 113 frees the swivel holder 80, rotating the swivel holder to the desired angularity, and then tightening the handle 114 to securely retain the swivel holder 80 in the position to which it has been rotated.

Adjustment of the pilot 60 of the top solder feeding mechanism 43 may be similarly accomplished to effect a disposition thereof at an angle to the vertical. A similar mechanism is also provided to permit removal of the pilot 60 and the swivel holder 97 in which it is mounted. As was mentioned above, the pilot 60 is supported in the swivel holder 97. The pilot 60 is securely retained in the swivel holder 97 by a locking pin 115 disposed in the swivel holder 97. Tightening of the nut 116 effects a locking of the pilot 60 in the swivel holder 97. The swivel holder 97 is securely retained in block 61 by a locking pin 117 disposed therein. The threaded portion of locking pin 117 engages the threaded bore of handle 118. Thus manipulation of handle 118 locks or frees the swivel holder 97 which is partially encircled by locking pin 117.

Although the top solder feeding mechanism 43 has been shown and described as having only a single piece of solder advanced thereby to effect the top soldering operation, the apparatus of this invention may be readily adapted to perform the top soldering operation on lamps having two base end contacts instead of one. This may be accomplished by similarly mounting an additional top soldering mechanism adjacent to the one shown and described. For example, a double serrated roll may be used instead of a single roll and a pair of pressure rolls may be used instead of a single pressure roll. The pilot may be provided with two chambers therein through which the solder may be advanced instead of one.

What we claim is:

In combination with a lamp basing machine having a plurality of lamp-holding heads mounted about the periphery thereof and moveable to a plurality of work stations, a solder dispensing apparatus disposed adjacent to one of said stations for simultaneously feeding measured amounts of solder to the bottom and side of a lamp in a lamp-holding head of the lamp basing machine, said solder dispensing apparatus comprising: a standard; a bedplate pivotally mounted on said standard; a pair of pilots fixedly mounted on one face of said bedplate, said pilots being disposed in substantially the same vertical plane and substantially perpendicular to one another; means, mounted on the same face of said bedplate as said pilots, for feeding a pre-determined quantity of solder through each of said pilots; means, mounted on the face of said bedplate opposite said first-mentioned face, for actuating said solder feeding means; means for rotating said pivotally mounted bedplate into and out of operative relationship with respect to a lamp in a lamp-holding head of the lamp basing machine at the solder-dispensing station; and means, actuated by the absence of a lamp in a head of the lamp basing machine, for rendering inactive said means for actuating said solder feeding means, when a lamp is not present in said head at the solder dispensing station.

References Cited in the file of this patent

UNITED STATES PATENTS

| Number | Name | Date |
|---|---|---|
| 842,187 | Eachus | Jan. 29, 1907 |
| 897,337 | Ballard | Sept. 1, 1908 |
| 899,542 | Kitselman | Sept. 29, 1908 |
| 1,082,270 | Karp | Dec. 23, 1913 |
| 1,379,682 | Griffin | May 31, 1921 |
| 1,563,612 | Cutler | Dec. 1, 1925 |
| 1,655,960 | Koning | Jan. 10, 1928 |
| 2,058,634 | Rusk | Oct. 27, 1936 |
| 2,082,080 | Palucki | June 1, 1937 |
| 2,093,527 | Petti | Sept. 21, 1937 |
| 2,285,872 | Pearson | June 9, 1942 |
| 2,296,158 | Gardner | Sept. 15, 1942 |
| 2,324,973 | Young | July 20, 1943 |
| 2,444,267 | Pereira | June 29, 1948 |
| 2,570,386 | Scheller | Oct. 9, 1951 |